United States Patent Office 3,229,132
Patented Jan. 11, 1966

3,229,132
EDDY-CURRENT COUPLING
Elie Cohen, 89 Rue Bobillot, Paris 13, France, and Szymon Roth, 18 Blvd. Barbes, Paris 18, France
Filed June 11, 1962, Ser. No. 201,606
Claims priority, application Germany, July 4, 1961, C 24,525
7 Claims. (Cl. 310—105)

The present invention relates to an eddy-current coupling.

According to the instant invention there is provided an eddy-current coupling or similar electromagnetic device comprising a fixed excitation coil mounted on a stator, and two co-axial rotors arranged in the stator, one rotor extending within the other, the inner rotor forming an inductor of homopolar type, and having on its periphery teeth spaced apart by recesses, while the outer rotor forms an armature and comprises a steel ring of high magnetic permeability, the said ring being carried by a light alloy plate provided laterally with fan vanes.

One embodiment of the coupling according to the invention is shown in the accompanying drawings in which.

Figure 1:
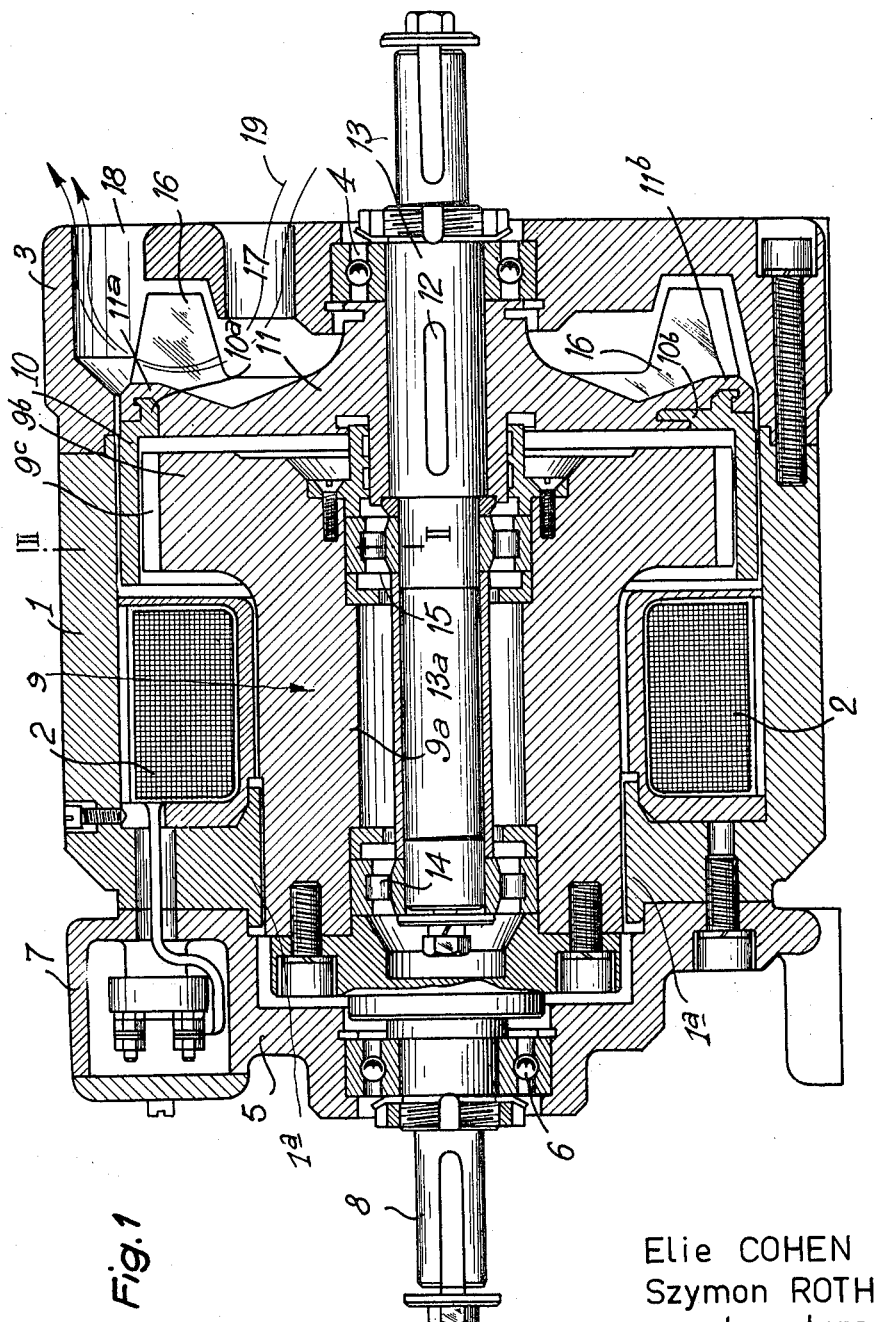
FIG. 1 is a longitudinal vertical sectional view through such a coupling.
Figure 2:
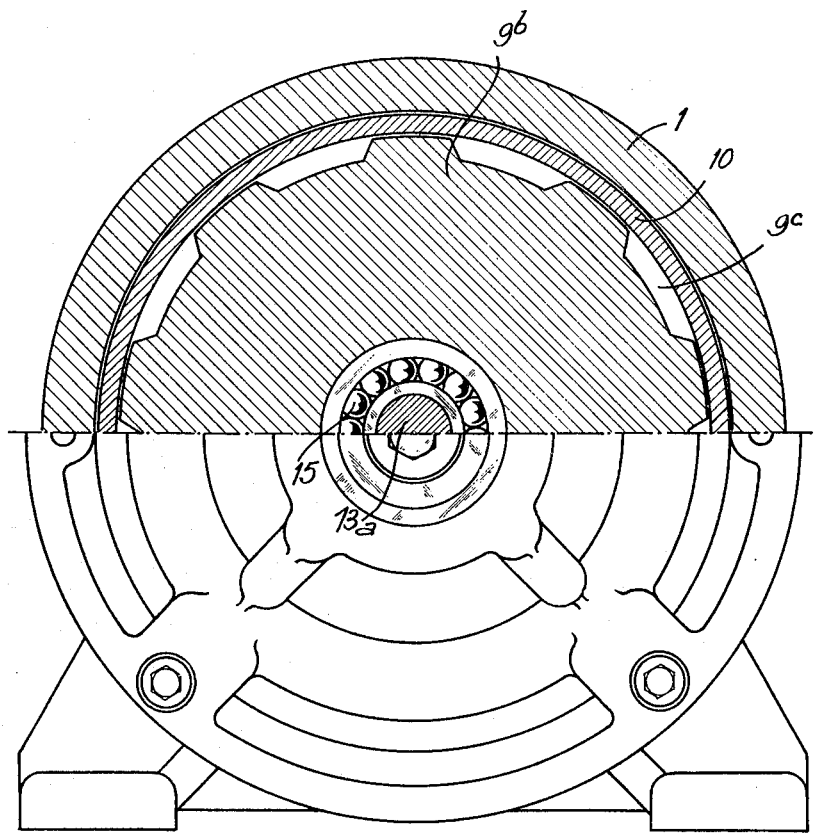
FIG. 2 is a corresponding end view half-sectioned on the line II—II of FIG. 1.

This embodiment as shown comprises a stator 1, an excitation coil 2, a right-hand stator plate 3 carrying ball-bearing 4, and a left-hand stator plate 5 carrying the ball-bearing 6, and an electrical connecting box 7, with an electrical connection leading to the coil 2.

A shaft 8 e.g., rotates in the bearing 6. This shaft is fixed to an inner rotor 9, of which one part 9a is formed by an elongated cylindrical sleeve, arranged opposite the coil 2, while the other part 9b, which is shorter and of larger diameter, is formed peripherally with teeth spaced apart by recesses 9c, the arrangement being such that the excitation coil 2 lies substantially wholly within the step formed by the difference in diameter of the parts 9a and 9b. This inner rotor is of the homopolar type and acts as an inductor.

The outer rotor 10 forms the armature. This comprises a steel ring of high magnetic permeability, which is provided laterally with grooves and ribs such as 10a and 10b, interlocked, during manufacture by a casting or fusion process, with corresponding ribs or grooves 11a, 11b, provided adjacent the periphery of a light-alloy plate 11. This plate has a central hub keyed at 12 to the drive shaft 13, an extension 13a of which enters the interior of an internal cylindrical cavity within the rotor 9, relatively to which it is supported by means of roller bearings 14 and 15.

The plate 11 is provided laterally with a number of fan vanes 16 which provide a current of cooling air, and since the plate 11 is in close contact with the rotor 10, the fan vanes operate also to increase the cooling surface of the armature rotor. Good thermal conductivity is produced by the intimate connection of the armature rotor 10 to the plate 11. The heat directed towards the vanes 16 is dissipated, due to the circulation of the current of cooling air entering through the openings 17 of the plate 3, and leaves by the openings 18 of this plate, following the path shown by the arrows 19.

The high thermal conductivity and speed of rotation of the plate 11 ensure extremely efficient cooling of the coupling. There is no circulation of external air in the remainder of the apparatus thereby avoiding the deposition of dust within the interior of the mechanism.

The fixed excitation coil 2, the frame of which is fixed to the stator 1, creates a magnetic field whose flux passes across the air-gap between the rotors 9 and 10, as well as the air-gaps between each rotor and the corresponding opposite part of the stator. Of these two air-gaps, that separating the rotor 9a from the stator part 1a is very narrow.

It will be seen in FIGURE 1 that the excitation coil 2 is arranged laterally of the rotor part 9b and rotor 10. It has a smaller mean diameter than that of the said rotors. This diameter is also less than that of excitation coils of couplings in which it is situated radially with respect to the said rotors. This arrangement also permits more advantageous cooling of the coil. Finally, the latter is of small bulk, permitting a coupling of small diameter to be made.

What we claim is:

1. An eddy-current coupling comprising housing means including a stator and defining a chamber therewithin having an axis and axially spaced ends; a first and a second shaft extending into said chamber from opposite ends thereof coaxially with said chamber and journaled for rotation therein; an inner rotor on said first shaft and an outer rotor on said second shaft and partly surrounding said inner rotor, said inner rotor being formed with a plurality of peripherally spaced teeth and constituting a homopolar inductor, said outer rotor forming an armature and comprising a ring of a magnetically permeable material coaxial with said second shaft; a disk of light-weight alloy, disposed at one end of said chamber coaxial with said outer rotor and substantially closing said chamber against air circulation, contiguous with said ring in thermally conductive relationship, said disk being provided with a plurality of fan vanes on a side axially opposite said outer rotor and exteriorly of said chamber for circulating air over said disk and dissipating heat therefrom axially thereof; and an excitation coil secured in said chamber for magnetizing said inner rotor.

2. A coupling as defined in claim 1, further comprising a fixed end plate coaxial with said disk and axially outwardly spaced therefrom while defining a cooling compartment therewith, said plate having a plurality of first openings proximal to the periphery thereof and of second openings proximal to said shaft communicating between the exterior and said compartment, said vanes extending into said compartment for aspirating a stream into said compartment through said second openings and then outwardly through said first openings.

3. A coupling as defined in claim 2 wherein said inner rotor is stepped and comprises a first portion having a relatively large chamber and provided with said teeth, said first portion being intimately surrounded by said outer rotor, and an elongated second portion having a relatively small diameter, said excitation coil closely surrounding said second portion of said inner rotor axially spaced from the inner diameter of said outer rotor.

4. A coupling as defined in claim 3 wherein at least a part of said stator closely surrounds said second part of said inner rotor at a position longitudinally spaced from said first part of said inner rotor.

5. A coupling as defined in claim 4 wherein said inner rotor is formed with an axially extending bore with said second shaft extending into said bore for rotation relative to said inner rotor.

6. A coupling as defined in claim 4 wherein said ring and said disk have juxtaposed sides with respective integral interengaging formations for forming an intimate, thermally conductive juncture.

7. An electromagnetic device, comprising a housing including a stator and defining a generally cylindrical chamber closed at one end by said housing and axially open at its other end; rotor means journaled in said housing for rotation about said axis; a shaft extending axially into said housing secured to said rotor means;

and exciting-coil means in said housing mounted on said stator for magnetizing said rotor means, said rotor means including an annular rotor member magnetizable upon energization of said exciting means and a heat-dissipating disk extending transversely to said axis and contiguous with said member for constituting a heat sink therefor while substantially closing said other end of said chamber, and a plurality of angularly spaced fins extending axially outwardly from said disk along a side thereof remote from said chamber for inducing a flow of cooling fluid along said disk to thereby cool said rotor means.

References Cited by the Examiner
UNITED STATES PATENTS

| | | | |
|---|---|---|---|
| 1,702,755 | 2/1929 | Weydell | 310—105 |
| 2,648,020 | 8/1953 | Jaeschke | 310—105 |
| 2,774,895 | 12/1956 | Zuckermann | 310—105 |
| 2,939,023 | 5/1960 | Fehr | 310—105 |

MILTON O. HIRSHFIELD, *Primary Examiner.*